United States Patent

Kesners

(10) Patent No.: US 7,977,265 B2
(45) Date of Patent: Jul. 12, 2011

(54) TRIBOCERAMIC COMPOUND

(75) Inventor: Maris Kesners, Riga (LV)

(73) Assignee: Cerlub Ou (EE)

(*) Notice: Subject to any disclaimer, the term of this patent is extended or adjusted under 35 U.S.C. 154(b) by 0 days.

(21) Appl. No.: 12/602,297

(22) PCT Filed: Sep. 26, 2008

(86) PCT No.: PCT/LV2008/000009
§ 371 (c)(1),
(2), (4) Date: Nov. 30, 2009

(87) PCT Pub. No.: WO2009/041795
PCT Pub. Date: Apr. 2, 2009

(65) Prior Publication Data
US 2010/0184585 A1    Jul. 22, 2010

(30) Foreign Application Priority Data
Sep. 27, 2007  (LV) .................................. P-07-109

(51) Int. Cl.
C04B 35/03    (2006.01)
C04B 35/053   (2006.01)
C04B 35/20    (2006.01)

(52) U.S. Cl. ......... 501/122; 501/112; 501/118; 501/119

(58) Field of Classification Search ................ 501/112, 501/118, 119, 122
See application file for complete search history.

(56) References Cited

U.S. PATENT DOCUMENTS
6,423,669 B1    7/2002    Alexandrov et al.

FOREIGN PATENT DOCUMENTS

| EP | 1867750 A2 | 12/2007 |
|---|---|---|
| JP | 57129862 | * 8/1982 |
| RU | 2057257 C1 | 3/1996 |
| RU | 2246531 C2 | 1/2004 |
| SU | 1359269 | * 12/1987 |
| WO | 9703231 | 1/1997 |
| WO | 2006058768 A1 | 6/2006 |

OTHER PUBLICATIONS

Xiao et al.; "Mechanical and Tribological Properties of Calcia-Magnesia-Alumina-Silica-Based Glass-Ceramics prepared by in Situ Crystallization"; Materials Science and Engineering A: Structural Materials: Properties, Microstructure & Processing, Lausanne, CH, 423 (1-2), pp. 170-174, (2006).

International Search Report, International Application No. PCT/LV2008/000009; International Filing Date: Sep. 26, 2008; Date of Mailing: Feb. 11, 2009; 3 pages.

Xiao, et al.; "Mechanical and Tribological Properties of Calcia-Magnesia-Alumina-Silica-Based Glass-Cermaics Prepared by in Situ Crystallization"; Materials Science and Engineering; A 423; pp. 170-174; (2006).

* cited by examiner

*Primary Examiner* — Karl E Group
(74) *Attorney, Agent, or Firm* — Cantor Colburn LLP

(57) ABSTRACT

The present invention relates to the machine building industry and it is used for coating of friction surfaces by triboceramics to decrease wear and to reduce the friction coefficient. The triboceramic compound contains oxides—magnesium oxide MgO, silica $SiO_2$, alumine $Al_2O_3$, calcium oxide CaO, ferric oxide $Fe_2O_3$, being in the chemical composition of serpentine and talc, the natural and/or synthesized heat unprocessed and/or dehydrated minerals—serpentine, talc, clinochlore, magnesite, quartz and aluminium hydroxide are introduced forming a mixture with the following composition of oxides, in mass %: $SiO_2$-46-54; MgO-26-32, Al2O3-2-5; $Fe_2O_3$-1.0-1.5; CaO-0.1-0.3, water $H_2O$-5 or less.

1 Claim, 2 Drawing Sheets

TRIBOCERAMIC COMPOUND

Cross-Reference to Related Applications

This application is a 371 of PCT/1v2008/000009 filed Sep. 26, 2008, which claims the benefit of the filing date of Sep. 27, 2007 to Latvian Provisional Application No. P-07-109 under provisions of 35 U.S.C. 119 and the International Convention for the protection of Industrial Property.

The invention relates to the machine building field and can be applied for the treatment of friction surfaces by triboceramics to improve the quality of surfaces and increase the working life of mechanisms.

Triboceramic compound of prior art is known from description to patent No. RU2246531, wherein a triboceramic compound is introduced into the lubricant and/or diesel fuel during the operation time of engine. Triboceramic layer is coated on the friction pairs of parts on/over their areas of surface contacts. The compound consists of (in mass %) serpentine—3-5, magnetite—2-3, dolomite—0.5-1, amphibole—1.5-2 and amachinite—1-2.

However, the actual composition of a compound depends on the location and a specific lot of raw materials, which may comprise a variety of admixtures. This does not allow to ensure stable triboceramic parameters. The compound is suitable to form triboceramic layer merely on hard ferric alloys.

The other triboceramics of prior art is to be covered on a part by electroplating in a thin layer according to description to the patent No. RU95111910. The compound consists of alfa-$Al_2O_3$, being introduced in the gamma-$Al_2O_3$ stencil. The alfa-$Al_2O_3$ crystals have a fibrous structure. Electrolysis takes place in alkaline aqueous solution. One electrode is made of copper, but the other one—of insoluble material by electroplating. The technology is very energy consuming and is not friendly to the surrounding environment.

The other compound, which provides formation of a new-made layer on the friction surfaces is known from description to patent No. RU2266979. The compound forms triboceramic layer on the friction surfaces of parts possessing self-restoration effect in the course of operation of a mechanism. The compound is made on the basis of natural nickel-iron-magnesium hydro-silicates (in mass %)—90-95—used as catalyst is forsterite or fayalite—5-10. The size of grains is 1-100 µm. The compound can be applied for ferric alloys only to cover the surfaces of ready-made parts.

Natural minerals, if not deliberately cleaned, usually contain a great and variable amount of admixtures of crystalline quartz. Consequently, this compound has very unstable quality parameters in use, and it can be applied for coating by triboceramics merely very hard surfaces.

The composition of prior art for the treatment of friction pairs described in the patent specification to U.S. Pat. No. 6,423,669 is the nearest to the technical essence and the result which must be reached by the invention presented in the embodied application. The mentioned composition is obtained by dehydration of hydrates at moving off the water of constitution with the destruction of the crystal lattice, at the temperature range of 350° C. to 900° C., containing oxides MgO, CaO, $Fe_2O_3$, $K_2O$, $Na_2O$ at the stable phase. According to this composition of prior art, both natural minerals and synthetic hydrates can be used.

If the hardness index of the raw materials—hydrates is approximately 2 to 3 according to the Moss scale, then for dehydrated hydrates it is within the range 5 to 7. The compound can be used to build up a triboceramic layer on the surfaces of merely ferrous alloys with great degree of hardness. It is not applicable for heat unprocessed surfaces and for the surfaces of non-ferrous metals as it leads to very strong abrasive wear of the surfaces.

The purpose of the presented invention is to widen the range of application of triboceramic coatings.

The aim of the presented invention is reached, when in the triboceramic compound containing oxides of the series of magnesium oxide MgO, silica $SiO_2$, alumina $Al_2O_3$, calcium oxide CaO, ferric oxide $Fe_2O_3$, according to invention the natural and/or synthesized heat unprocessed and/or dehydrated minerals—serpentine, talc, clinochlore, magnesite, quartz and aluminium hydroxide are introduced in a triboceramic compound providing formation of the triboceramic compound with the following composition of oxides (in mass %): —$SiO_2$-46-54, MgO-26-32, $Al_2O_3$-2-5, $Fe_2O_3$-1.0-1.5, CaO-0.1-0.3, water $H_2O$-5% or less.

The invention is explained by the enclosed drawings, wherein

Figure 5:
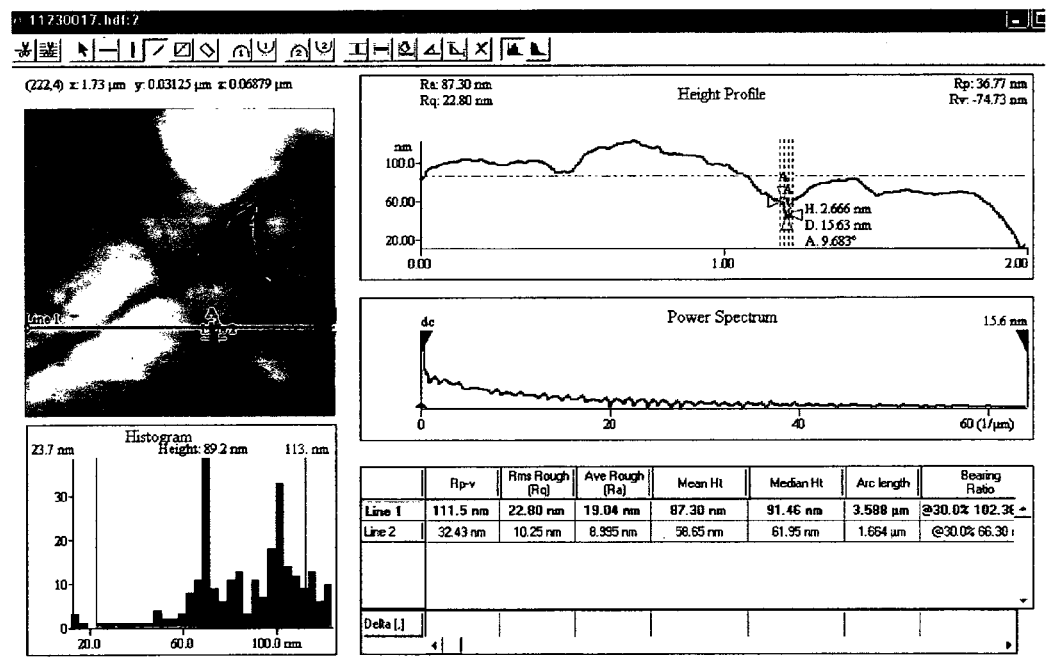

FIG. 5. shows the Talyrond trace of the coated specimen.

The natural and/or synthesized heat unprocessed and/or dehydrated minerals—serpentine, talc, clinochlore, magnesite, quartz and aluminium hydroxide are introduced in a triboceramic compound containing oxides: magnesium oxide MgO, silica $SiO_2$, alumina $Al_2O_3$, calcium oxide CaO, ferric oxide $Fe_2O_3$, comprised in the chemical composition of serpentine and talc, thus forming a compound with the following composition of oxides (in mass %)—$SiO_2$-46-54, MgO-26-32, $Al_2O_3$-2-5, $Fe_2O_3$-1.0-1.5, CaO-0.1-0.3, $H_2O$-5% or less.

With the triboceramic compound, containing oxides—MgO, $SiO_2$, $Al_2O_3$, CaO, $Fe_2O_3$, comprised in the chemical composition of serpentine and talc, the natural and/or synthesized heat unprocessed and/or dehydrated minerals serpentine, talc, clinochlore, magnesite, quartz and aluminium hydroxide, forming a compound with the following composition of oxides (in mass %)—$SiO_2$-46-54, MgO-26-32, $Al_2O_3$-2-5, $Fe_2O_3$-1.0-1.5, CaO-0.1-0.3, $H_2O$-5% or less, the parts are coated by pressing them reciprocally, causing sliding and/or rolling friction between the surfaces.

The particles of the compound while pressed between the surfaces, are plastically deformed and/or destroyed. Mechano-activation of the compound takes place too. During this process heat build-up takes place. If the hydrate is heat unprocessed and contains the bound water, it has a lower degree of hardness and it is much more pliable if compared with the dehydrated one. In the course of thermal process water is liberated causing fall in the temperature of a particle, nevertheless the sintering temperature is reached.

The particles become pliable and the bonds in the crystal lattice are disengaged in the area of the liberated bound water. Reciprocal sintering of particles provides formation of ceramic layer. It is relatively soft and easy to deform. While increasing the pressure between the particles, the respective layer gets consolidated and provides formation of compact olivine layer. Fayalite is being formed at the contact area with the surface containing iron and the reason of this is the interchange of Fe$\leftrightarrow$Mg between triboceramics and base layer. Further on a layer of forsterite is built up. In theory, the latter can be formed without any limits. In practice, the amount of the introduced compound and the size of parts limit it.

Figure 1:
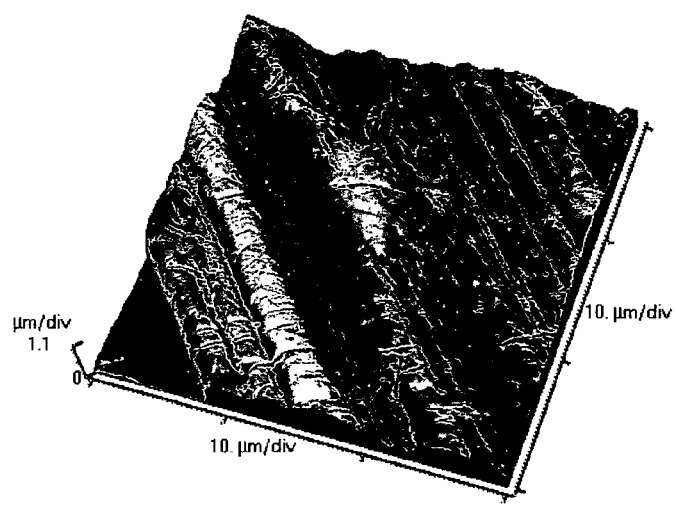
FIG. 1 shows the specimen at the initial stage of coating.

FIG. 1 shows how fayalite-phorsterite layer has covered the profile peaks caused by grinding and the process of the infill of cavities has set in (in the central part of the picture).

Figure 2:
FIG. 2 shows the specimen at the final stage of coating.

FIG. 2 depicts the specimen at the final stage of coating. The profile of the traces of grinding is not evident. Triboceramic layer has covered the whole surface of the part and is forming a continuous friction surface.

Figure 3:
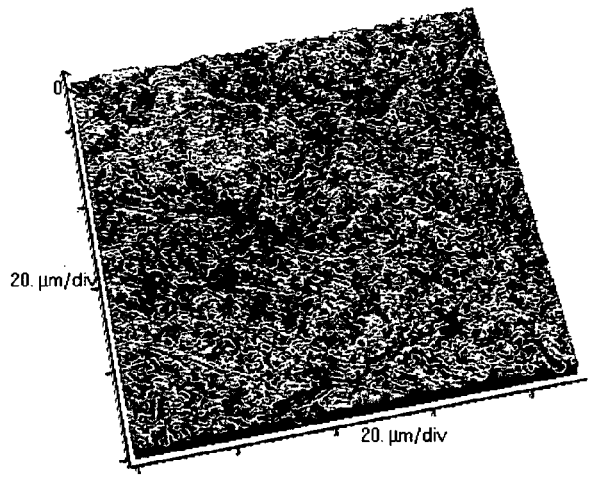
FIG. 3 shows the specimen coated by low pressure between parts.

FIG. 3 shows the picture of the surface, built up of a heat unprocessed compound under low pressure. It provides formation of triboceramic layer consisting mainly of the hydrates, forming the compound. It is porous in structure and is capable of retaining lubricants in its pores. Upon pressing, the layer undergoes elastic deformations and lubricants are squeezed out on the surface. If pressure is removed the lubricant is soaked up back into triboceramic layer. An uninterrupted process of oiling of the sliding surfaces of parts takes place. The hardness of triboceramic layer is in the rage of 2 to 3 according to the Moss scale.

Figure 4:
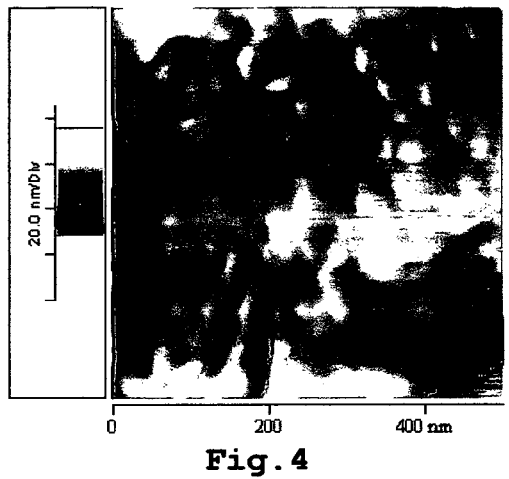
FIG. 4 shows the specimen coated by high pressure between parts.

FIG. 4 depicts the picture of the surface, on which triboceramic layer was formed out of the dehydrated compound under the action of high pressure. The surface is dense and without pores. The hardness of the surface is in the range of 6-7 according to the Moss scale.

FIG. 5 depicts the Talyrond trace of the surface shown in FIG. 4. It is evident from the picture that the profile of the surface has no sharp edges. If such surfaces are mutually sliding, there will be no elements on a profile, which might be mutually gripped and "spot-welded" as a result of friction and thus, by ripping the bonds of welding, cause wear of the surfaces of parts.

Even if the friction surfaces start reciprocally moving and all the lubricant between the surfaces is squeezed out, the smooth and hard protuberances of the surface are sliding past each other without getting gripped. Once the movement has normally started off, it provides the formation of a normal layer of the lubricant and the surfaces get into contact merely through the layer of the lubricant.

By changing the components introduced in the compound it is possible to change the amount of the bound water. Thus the temperature of the process can be adapted. If all the component parts are the heat unprocessed hydrates, the process will take place at lower temperatures and will provide the formation of more pliable and porous triboceramic layer. In order to decrease the temperatures even more, alumina gel $Al(OH)_3$ is introduced in the compound. Consequently, it liberates water in great amount thus considerably lowering the temperature of the formation of triboceramic layer. Alumina gel $Al_2O_3$, which remains after the liberation of water, increases the hardness of triboceramic layer. If soft materials such as untempered ferrum Fe alloys and alloys of non-ferrous metals, are coated with triboceramics, the particles of the dehydrated compound will merely cause abrasive wear of a part when pressed on the surface of a part. Consequently, it will not provide formation of triboceramic layer. In order to provide it, the heat should be emitted as a result of deformation, in such a micro amount as to liberate the bound water out of the compound, thus disengaging the bonds.

The temperature at the contact area of the contact surface of a part and the particles of a compound should be such as to cause the joining of the crystal lattices both of a part and the particles of a compound. The interchange of Fe$\leftrightarrow$Mg, or any other elements take place, depending on metal alloys.

This is a harmonized process, where the properties of both the elements—the compound and the part should be taken into account. A large dispersion in the composition of a compound is to be excluded in order to obtain the required precision in the process, which mostly depends on the composition and pressure. As the composition of natural raw materials differs even within the boundaries of one and the same mine, each lot of raw materials should be tested separately and the proportions of ingredients are to be calculated according to the results of the tests. The synthetic materials do not encounter this problem, therefore it is advised to use synthetic components in triboceramic compounds.

The presented compound can be used to form a wear-resistant triboceramic layer with an extremely low friction coefficient on the friction surfaces of the parts of different metal alloys.

The invention claimed is:

1. A triboceramic compound made from a mixture of serpentine, talc, clinochlore, magnesite, quartz and aluminium hydroxide with the following chemical composition, in mass %:

$SiO_2$-46-54,
MgO-26-32,
$Al_2O_3$-2-5,
$Fe_2O_3$-1.0-1.5,
CaO-0.1-0.3,
$H_2O$-5 or less.

* * * * *